(12) United States Patent
Kopylovitz et al.

(10) Patent No.: US 9,021,232 B2
(45) Date of Patent: Apr. 28, 2015

(54) MULTIPATH STORAGE SYSTEM AND METHOD OF OPERATING THEREOF

(75) Inventors: Haim Kopylovitz, Herzliya (IL); Leo Corry, Ramat Gan (IL)

(73) Assignee: Infinidat Ltd., Herzliya (IL)

( * ) Notice: Subject to any disclaimer, the term of this patent is extended or adjusted under 35 U.S.C. 154(b) by 972 days.

(21) Appl. No.: 13/173,465

(22) Filed: Jun. 30, 2011

(65) Prior Publication Data

US 2013/0007410 A1 Jan. 3, 2013

(51) Int. Cl.
*G06F 12/00* (2006.01)
*G06F 3/06* (2006.01)

(52) U.S. Cl.
CPC .............. *G06F 3/061* (2013.01); *G06F 3/0635* (2013.01); *G06F 3/067* (2013.01)

(58) Field of Classification Search
CPC ........ G06F 3/061; G06F 3/0635; G06F 3/067
USPC .......................................... 711/114, 154, 209
See application file for complete search history.

(56) References Cited

U.S. PATENT DOCUMENTS

| | | | | |
|---|---|---|---|---|
| 5,720,028 | A * | 2/1998 | Matsumoto et al. | 714/5.11 |
| 6,032,189 | A * | 2/2000 | Jinzenji et al. | 709/235 |
| 7,181,578 | B1 * | 2/2007 | Guha et al. | 711/154 |
| 7,299,334 | B2 | 11/2007 | Zohar et al. | |
| 7,318,138 | B1 * | 1/2008 | Usgaonkar et al. | 711/163 |
| 2005/0228943 | A1 | 10/2005 | DeCenzo et al. | |
| 2007/0088917 | A1 | 4/2007 | Ranaweera et al. | |
| 2007/0094472 | A1 | 4/2007 | Marks et al. | |
| 2007/0174517 | A1 | 7/2007 | Robillard et al. | |
| 2007/0297338 | A1 | 12/2007 | Mou et al. | |
| 2008/0162987 | A1 | 7/2008 | El-Batal | |
| 2008/0201602 | A1 | 8/2008 | Agarwal et al. | |
| 2008/0301332 | A1 | 12/2008 | Butler et al. | |
| 2009/0094620 | A1 | 4/2009 | Kalwitz et al. | |
| 2010/0146206 | A1 | 6/2010 | Yochai et al. | |
| 2010/0153638 | A1 | 6/2010 | Yochai et al. | |
| 2010/0153639 | A1 | 6/2010 | Corry et al. | |

OTHER PUBLICATIONS

Elliott, Robert C., "Information Technology—Serial Attached SCSI-2 (SAS)", T10 Technical Committee, working draft, Project T10/1760-D; Revision 16; Apr. 18, 2009; American National Standard Institute.
Hewlett Packard Corp., "Serial Attached ScSi Technology," 2006. http://h20000.www2.hp.com/bc/docs/support/SupportManual/c00302340/c00302340.pdf.

* cited by examiner

*Primary Examiner* — Larry Mackall
(74) *Attorney, Agent, or Firm* — Oren Reches (57) ABSTRACT

There is provided a method of operating a multipath storage system, the method comprises: identifying a primary storage control port configured to be responsible for a given LBA range and a secondary storage control port configured to have secondary responsibility for the given LBA range; reducing, in a manner unaffecting respective inbound I/O operation, outbound I/O operation related to the given LBA range and occurring at the primary storage control port, thereby causing a situation requiring switching all respective I/O requests to an alternating path; analyzing responsive changes in outbound I/O operation related to the given LBA range and occurring at the secondary storage control port, and verifying operability of switching to the alternating path in accordance with the obtained results. Outbound I/O operation can be reduced with the help of a routine configured to identify inbound I/O requests directed to the given LBA range and to put these requests on hold for a delay period, thus giving rise to delayed I/O requests, wherein the delay period is configured to be long enough to enable switching to an alternating path.

15 Claims, 4 Drawing Sheets

MULTIPATH STORAGE SYSTEM AND METHOD OF OPERATING THEREOF

FIELD OF THE INVENTION

The present invention relates, in general, to data storage systems and respective methods for data storage, and, more particularly, to storage systems having multiple path capability and methods of operating thereof.

BACKGROUND OF THE INVENTION

Modern enterprises are investing significant resources to preserve and provide access to data. Data protection is a growing concern for businesses of all sizes. Users are looking for a solution that will help to verify that critical data elements are protected, and storage configuration can enable data integrity and provide a reliable and safe switch to redundant computing resources in case of an unexpected disaster or service disruption.

To accomplish this, storage systems may be designed as fault tolerant systems spreading data redundantly across a set of storage-nodes and enabling continuous operation when a hardware failure occurs. Fault tolerant data storage systems may store data across a plurality of disk drives and may include duplicate data, parity or other information that may be employed to reconstruct data if a drive fails.

There has been known a technology of setting a plurality of accessible paths between a storage system and a host and/or within the storage system. Multiple paths can enable balancing I/O requests among the plurality of paths. Providing alternate path can also enable availability of data and/or storage resources, wherein if a failure occurs in one path, access is allocated to an alternating path, thereby allowing the operation to continue.

The problems of multi-path storage systems have been recognized in the Contemporary Art and various systems have been developed to provide a solution, for example:

US Patent Application No. 2005/228943 (DeCenzo et al.) entitled "Multipath redundant storage system architecture and method" discloses a storage system and method that provides multi-path bus and component interconnection and isolation in a data storage system. A plurality of data storage devices in a removable assembly are connected to a fabric that is configurable to connect some or all of the data storage devices to a disc controller and configurable to isolate one or more data storage devices from the disc controller. Multiple controllers, fabrics, and interconnecting buses may be employed to provide redundancy in the event of a connector, bus, or controller failure. Computer program code operating in a host, interface controller, and/or disc controller configures the fabric to isolate failed devices and may be employed to optimize data transfer rates. Data storage devices may be multi-ported. The fabric may comprise any device or devices capable of configurably interconnecting data storage devices to one or more controllers and may comprise multiplexers, cross point switches, port bypass controllers. Fabrics may also provide translation or conversion of one bus or interface format to another format.

US Patent Application No. 2007/297338 (Mou et al.) entitled "Verification of path selection protocol in a multipath storage area network" discloses verification of path selection protocol for a storage area network. The verification comprises disabling a switch port on a switch of the primary path of a data storage device, initiating an input/output command to the device, and verifying that a failover occurred. The switch port for the primary path is enabled, an "immediate" input/output command is initiated to the device with the "immediate" bit set; and, in response to a notification by the device resulting from the "immediate" bit, a switch port is disabled on the switch of the primary path for the device; and the method verifies that a failover occurred.

US Patent Application 2008/301332 (Bulter et al.) entitled "Method for using host and storage controller port information to configure paths between a host and storage controller" discloses a method for using host and storage controller port information to configure paths between a host and storage controller. Information is gathered on ports on at least one host, ports on at least one storage controller managing access to storage volumes, and at least one fabric over which the at least one host and storage controller ports connect. For at least one host port and storage controller port, information is gathered on a connection metric related to a number of paths in which the port is configured and a traffic metric indicating Input/Output (I/O) traffic at the port. A determination is made of available ports for one host and storage controller that are available to provide paths between one host and storage controller. The connection and traffic metrics for the available host ports are processed to select at least one host port. The connection and traffic metrics for the available storage controller ports are processed to select at least one storage controller port. The at least one selected host and storage controller port pair are configured to provide at least one path enabling the host to communicate with the selected storage controller port to access at least one storage volume managed by the selected storage controller.

SUMMARY OF THE INVENTION

In accordance with certain aspects of the presently disclosed subject matter, there is provided a method of operating a multipath storage system. The method comprises: identifying a primary storage control port configured to be responsible for a given range of logical block addresses (LBA) and a secondary storage control port configured to have secondary responsibility for the given LBA range; reducing, in a manner unaffecting respective inbound I/O operation, outbound I/O operation related to the given LBA range and occurring at the primary storage control port, thereby causing a situation requiring switching all respective I/O requests to an alternating path; analyzing responsive changes in outbound I/O operation related to the given LBA range and occurring at the secondary storage control port, and verifying operability of switching to the alternating path in accordance with the obtained results.

The switching to the alternating path can be verified as successful if a responsive increase in the outbound I/O operation at the secondary storage control port related to the said given LBA range matches a predefined criterion.

In accordance with further aspects of the presently disclosed subject matter, the outbound I/O operation at the primary storage control port can be reduced with the help of a routine configured to: identify inbound I/O requests directed to the given LBA range and to putting these requests on hold for a delay period, thus giving rise to delayed I/O requests, wherein the delay period is configured to be long enough to enable switching to an alternating path. Operation of said routine can be disabled if said delayed I/O requests are pending at the primary control storage port upon the end of the delay period, wherein the delay period is configured to be short enough to minimize possible interruption caused by delaying the outbound I/O requests if the switching to the alternating path is unsuccessful. The routine can run as a background process enabling continuous scheduled verification of operability of switching to the alternating path. Alternatively or additionally, the routine can be activated per certain event and/or schedule. The routine can be further configured to emulate inbound I/O requests at the primary storage control port in order to enable further substantial reduction of the outbound I/O operation.

Alternatively or additionally, the outbound I/O operation at the primary storage control port can be reduced with the help of Asymmetric Logical Unit Access (ALUA) technology.

In accordance with further aspects of the presently disclosed subject matter, the method of operating a multipath storage system can comprise: identifying, for a first given LUN controlled by a first primary storage control port of a primary storage control device, a respective first secondary storage control port configured to have secondary responsibility for the given LUN and comprised in a secondary storage control device; reducing, in a manner unaffecting respective inbound I/O operation, outbound I/O operation related to the first given LUN and occurring at the first primary storage control port, thereby causing a situation requiring switching respective I/O requests to an alternating path; analyzing responsive changes in outbound I/O operation related to the first LUN and occurring at the respective first secondary storage control port; verifying operability of switching to the alternating path in accordance with the obtained results; and verifying operability of switching responsibility from the primary storage control device to one or more secondary control devices, wherein switching responsibility from the primary storage control device to one or more secondary control devices is successful if verification of switching to the alternating path is successful for all LUNs primary controllable by the primary storage control device. Switching to the alternating path can be verified for primary controllable by the primary storage control device LUNs in a successive manner until a first negative result is obtained. Switching of responsibility from the primary storage control device to one or more secondary control devices is verified as successful if responsive increases in the outbound I/O operation at all respective secondary storage control ports match a predefined criterion.

Verification of operability of switching responsibility from the primary storage control device to one or more secondary control devices can be provided before shutting down the primary storage control device for hot upgrade purposes.

In accordance with further aspects of the presently disclosed subject matter, there is provided a method of operating an ALUA-enabled multipath storage system, the method comprises: configuring a first primary storage control port corresponding to a first LUN among the LUNs primary controllable by the primary storage control device as non-optimized thereby causing reduction of outbound I/O operation at this port subject to that the corresponding secondary storage control port is operable; analyzing responsive changes in outbound I/O operation related to the first LUN and occurring at the first primary storage control port; verifying operability of switching to an alternating path in accordance with the obtained results; and verifying operability of switching responsibility from the primary storage control device to one or more secondary control devices, wherein switching responsibility from the primary storage control device to one or more secondary control devices is successful if verification of switching to the alternating path is successful for all LUNs primary controllable by the primary storage control device.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "analyzing", "identifying" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein may be performed by a computer specially constructed for the desired purposes or by a general-purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The references cited in the background teach many principles of operating a storage system that are applicable to the presently disclosed subject matter. Therefore the full contents of these publications are incorporated by reference herein where appropriate for appropriate teachings of additional or alternative details, features and/or technical background.

The term "criterion" used in this patent specification should be expansively construed to include any compound criterion, including, for example, several criteria and/or their logical combinations.

Certain embodiments of the presently disclosed subject matter are applicable to the architecture of a storage system described with reference to FIG. 1. However, the invention is not bound by the specific architecture and is applicable to any storage system (including storage networks) implementing alternating paths between hosts and data storage devices. Such a storage system with alternating paths is also referred to hereinunder as a multipath storage system. Likewise, the teachings of the presently disclosed subject matter are applicable when a multiple path architecture alternation is provided between a host and a storage system and/or within the storage system (e.g. between a host and a storage controller and/or between a storage controller and a storage device, etc.).

Figure 1:
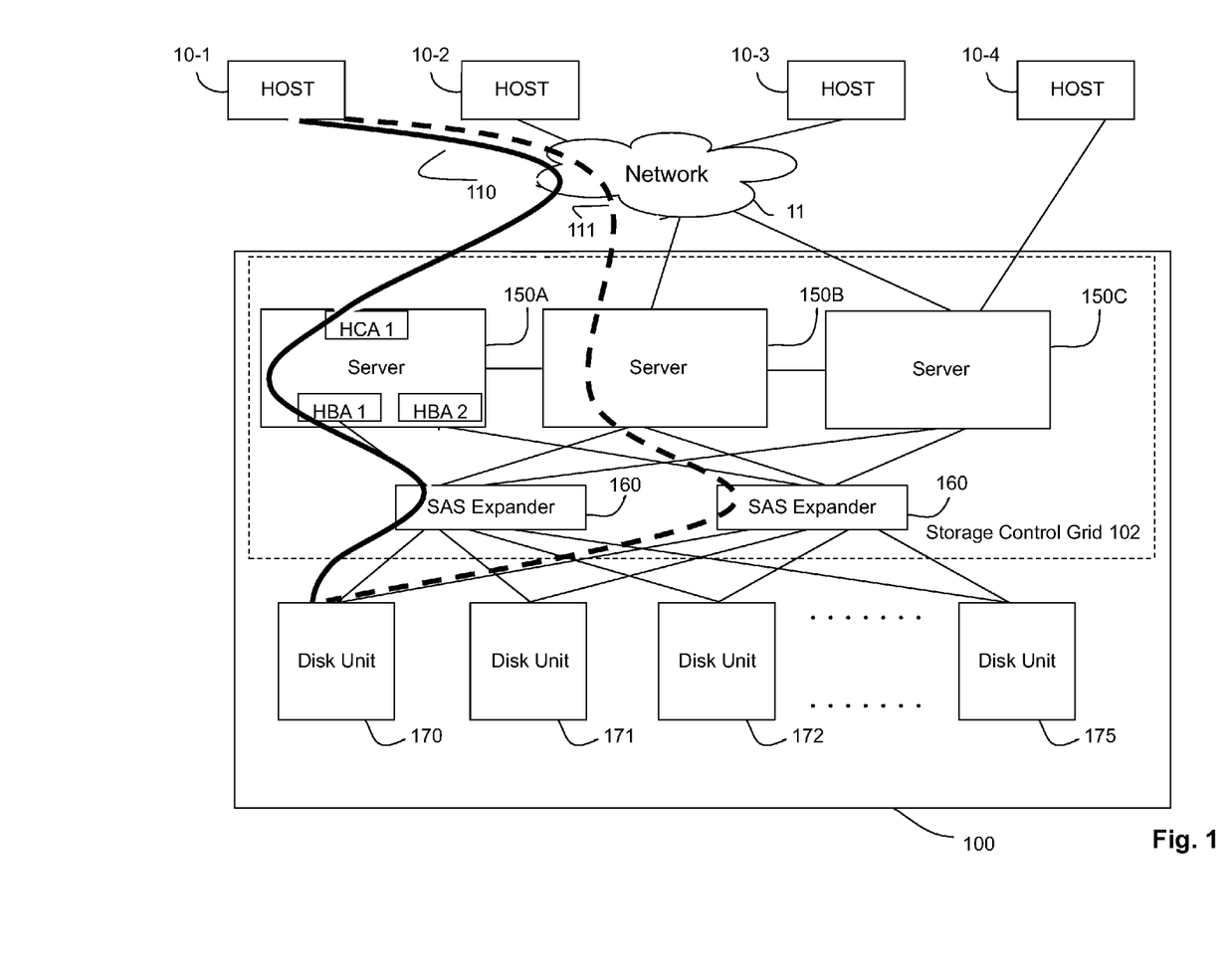
FIG. 1 illustrates an exemplary schematic functional block-diagram of a multipath storage system.

Bearing this in mind, attention is drawn to FIG. 1 illustrating an exemplary schematic functional block-diagram of a multipath storage system. This exemplary multipath storage system has been disclosed in US Application 2010/153639 assigned to the assignee of the presently disclosed subject matter and incorporated herein by reference in its entirety.

Host computers (illustrated as 10-1, 10-2, 10-3, 10-4) share common storage means provided by a grid storage system 100. The storage system comprises a storage control grid 102 comprising a plurality of servers (illustrated as 150A, 150B, 150C) operatively coupled to the plurality of host computers and operable to control I/O operations between the plurality of host computers and a grid of storage nodes comprising a plurality of disk units (illustrated as 171-175). The storage control grid 102 is further operable to enable necessary data virtualization for the storage nodes and to provide placing the data on the nodes.

Any individual server of the storage control grid 102 can be operatively connected to one or more hosts 500 via a fabric 11 such as a bus, or the Internet, or any other suitable means known in the art. The servers are configured to control I/O operations between the hosts and respective disk units, and can be operable in accordance with at least one SAS protocol.

Each of the disk units (DUs) 170-175 can comprise two or more disk drives operable with at least one SAS protocol (e.g. DUs may comprise SAS disk drives, SATA disk drives, SAS tape drives, etc.). The disk units are operable to store data at respective ranges of logical block addresses (LBAs), said addresses constituting an entire address space.

The storage control grid 102 further comprises a plurality of SAS expanders 160. A SAS expander can be generally described as a switch that allows multiple initiators and targets to communicate with each other, and allows additional initiators and targets to be added to the system (up to thousands of initiators and targets in accordance with SAS-2 protocol). The so-called "initiator" refers to the end in the point-to-point SAS connection that sends out commands, while the end that receives and executes the commands is considered as the "target."

Each disk unit is directly connected to at least two SAS expanders 160; each SAS expander is directly connected to all disk units. Each SAS expander is further directly connected to at least two interconnected servers comprised in the storage control grid. Each such server is directly connected to at least two SAS expanders. Thus each server has direct access to the entire address space of the disk units.

Each server further comprises one or more Host Channel Adapters (HCA's) (illustrated for server 150A as HCA1) operable to enable communication with the hosts 500 in accordance with appropriate protocols and two or more SAS Host Bus Adapters (HBA's) (illustrated for server 150A as HBA1 and HBA2) operable to communicate with the SAS expanders 160 and to enable the respective data flow.

The redundant hardware architecture illustrated with reference to FIG. 1 provides the storage system with failure tolerance. When a first server in the control grid 102 is configured to have a primary responsibility for handling requests directed to a certain range of LBAs, a second server in the control grid 102 can be configured to have a secondary responsibility for handling requests directed to this certain range of LBAs and to overtake the primary responsibility for handling respective requests if the first server fails. In order to support the failure tolerance, the storage system shall be configured in a multi-path mode, i.e. if one of the paths between a servicing host and respective disk unit(s) is interrupted, respective data flow shall be enabled via an alternating path. An exemplary primary path from the host 10-1 to a certain range of LBAs stored at disk 170 is illustrated by a bold line 110, and respective exemplary alternating path is illustrated by a dashed line 111. The alternating path can be used for failover and/or load balancing purposes.

Those versed in the art will readily appreciate that in certain embodiments the storage system can be configured to operate in a partly multi-path mode, wherein alternating paths are enabled only for certain part of the system (e.g. within the storage control grid, between the servicing host and the control grid, etc.).

However, even properly configured, an alternating path may be incapable of operating satisfactorily when necessary. By way of non-limiting example, such a situation can occur when one or more devices and/or connections therebetween involved in the path are down, or have been disabled without proper alerting, or operate with unsatisfactory characteristics, etc.

Figure 2:
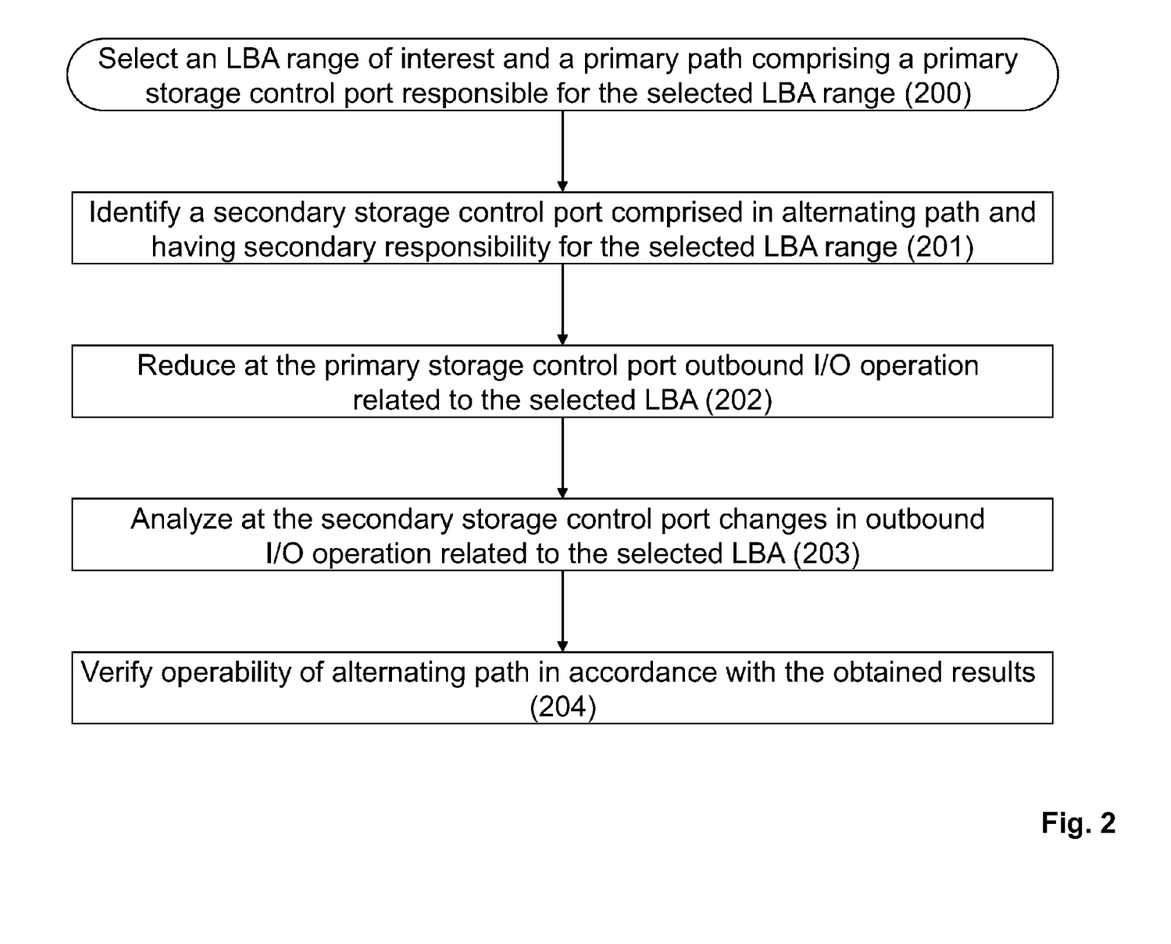
FIG. 2 illustrates a schematic flow chart of verifying operability of switching to a path alternating to a given path in accordance with certain embodiments of the presently disclosed subject matter.

FIG. 2 illustrates a schematic flow chart of verifying operability of switching to a path alternating to a given path.

Upon selecting (200) an LBA range of interest and a primary storage control port configured to be responsible for the selected LBA range, the storage system and/or administrator identify (201) a secondary storage control port configured to have secondary responsibility for the selected LBA range. Accordingly, the primary path passes via the primary storage control port, and the alternating path passes via the secondary storage control port. Optionally, the storage system and/or administrator can further define all ports and connections therebetween involved in the primary and alternating paths or part(s) thereof. Depending on the storage system and/or configuration thereof, the primary and the secondary storage control ports can be parts of the same or of different storage control devices. By way of non-limiting example, in the storage system illustrated in FIG. 1 the primary server can comprise the primary storage control port, and the secondary server can comprise the secondary storage control port.

When necessary to verify the operability of switching to the alternating path, the storage system reduces (202) outbound I/O operation related to the selected LBA range and occurring at the primary storage control port (e.g. I/O requests between the port and respective one or more storage devices) in a manner unaffecting inbound I/O operation at said port (e.g. I/O requests between the port and respective one or more hosts), thereby causing a situation requiring switching all respective I/O requests to the alternating path.

The method further comprises analyzing (203) responsive changes (if any) in outbound I/O operation related to the selected LBA range and occurring at the secondary storage control port, and verifying (204) operability of switching to the alternating path in accordance with the obtained results. Sufficient increase in the outbound I/O operation at the secondary storage control port, wherein said operation is related to the same LBA range as the reduced outbound I/O operation at the primary storage control port, indicates successful switching the I/O requests to the alternating path. Lack of responsive changes in respective outbound I/O operation at the secondary storage control port indicates that the alternating path and/or respective switching process are non-operable. The increase in outbound I/O activity is considered as sufficient if it matches a predefined criterion. By way of non-limiting example, such a criterion can be related to a ratio between reduction of outbound activity at the primary port and respective increase of the outbound activity at the secondary port and/or can be predefined as a threshold value.

Optionally, the storage system can be further configured to compare the changes in I/O operation at the secondary storage control port and reduction in outbound I/O operation at the primary storage control port for further evaluating the quality of the alternating path.

The outbound I/O operation at the primary storage control port can be reduced (in a manner unaffecting inbound I/O operation at said port) with the help of a special routine introducing latencies for respective outbound I/O requests. The routine can be configured to identify I/O requests arriving from the host(s) and directed to the selected LBA range (inbound I/O requests), and putting these requests on hold for a certain delay period (e.g. several seconds). This period shall be long enough to exceed the time of I/O delay configured in the storage system as time required for switching to an alternating path; and shall be short enough to minimize possible interruption of respective application(s) because of delaying outbound I/O requests if the switching to the alternating path is unsuccessful. If, when the delay period run is over, the delayed I/O requests are still pending at the primary control storage port (i.e. have not been switched to the alternative path), the respective requests are further served by the primary control storage port.

The routine can run as a background process enabling continuous scheduled verification, can be automatically initiated in accordance with a certain schedule and/or can be initiated in accordance with certain event(s) (e.g. administrator's request). Optionally, the routine can emulate inbound I/O requests at the primary storage control port in order to enable further substantial reduction of the outbound I/O operation.

Those versed in the art will readily appreciate that, likewise, the teachings of the currently disclosed subject matter are applicable, alternatively or additionally, to verifying switching to the alternating path for I/O requests matching other than selected LBA range criterion (e.g. I/O requests related to a certain application, a certain group of hosts, a certain storage location, certain type of data, etc.).

Figure 4:
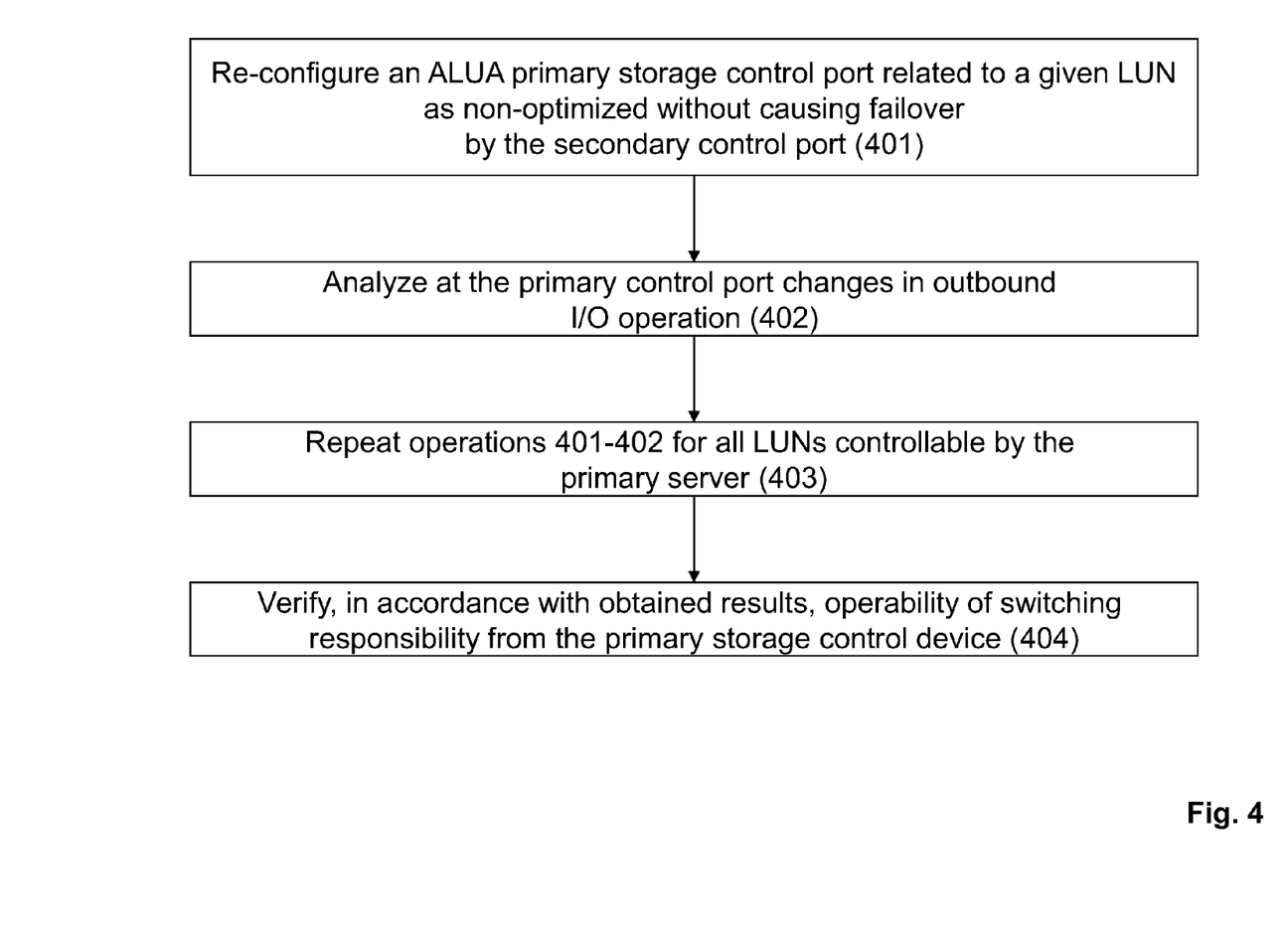
FIG. 4 illustrates a schematic flow chart of verifying operability of switching to a secondary control device should a takeover be required in accordance with alternative certain embodiments of the presently disclosed subject matter.

Alternatively or additionally, in certain embodiments of the currently presented subject matter, the outbound I/O operation related to the selected LBA can be reduced with the help of ALUA (Asymmetric Logical Unit Access) technology as will be further detailed with reference to FIG. 4.

Figure 3:
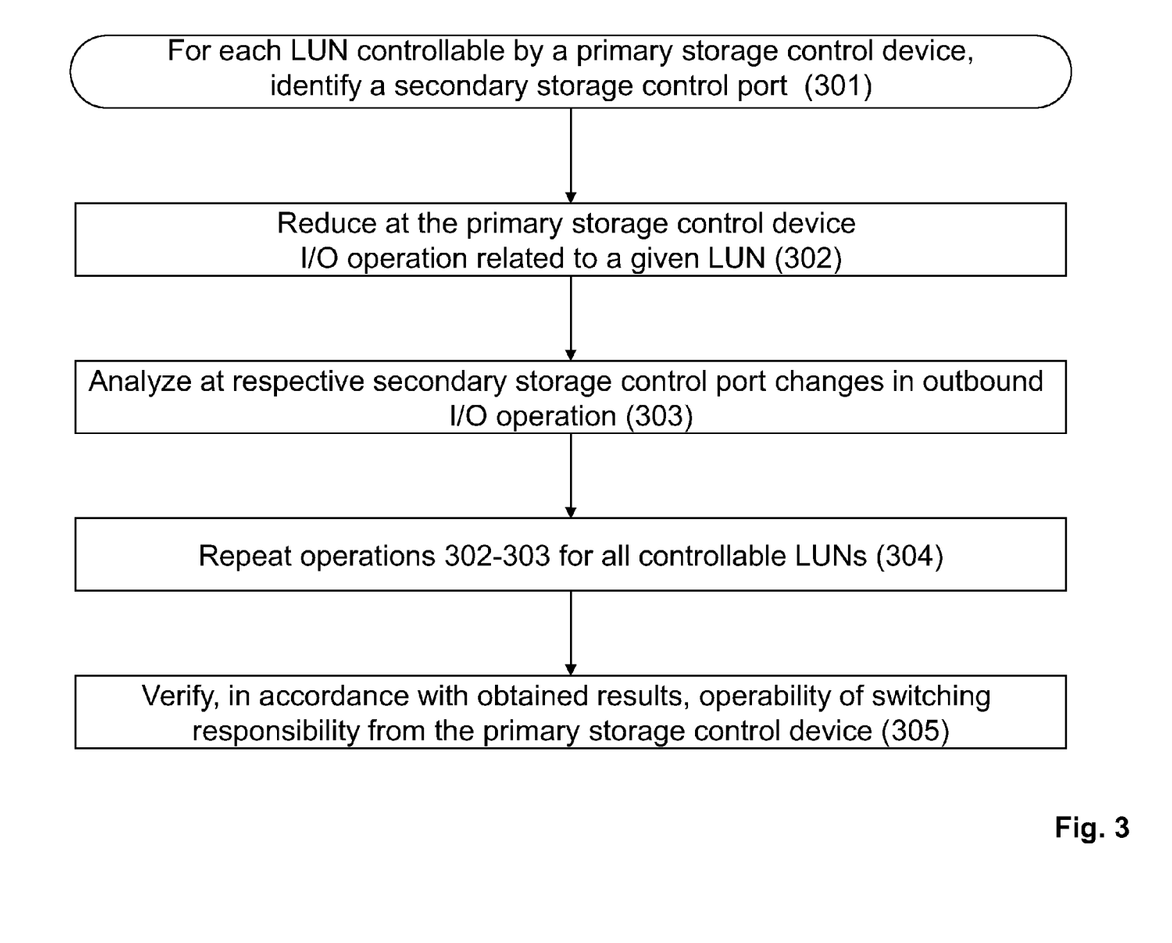
FIG. 3 illustrates a schematic flow chart of verifying operability of switching to a secondary control device should a takeover be required in accordance with certain embodiments of the presently disclosed subject matter.

As illustrated by a schematic flow chart in FIG. 3, the teachings of the presently disclosed subject matter can be further applied for verifying operability of switching to one or more secondary control devices, should a takeover be required.

By way of non-limiting example, in the storage system illustrated in FIG. 1 the server 150-A can be configured as the primary storage control device and the server 150-B can be configured as the secondary storage control device for all LUNs controlled by the server 150-A. If, during the operation of the storage system, the server 150-A needs to be down (e.g. for hot upgrade or other maintenance purposes), there is a need to verify operability of switching I/O requests to the control of the server 150-B before switching-off the server 150-A.

For each given LUN controlled by the primary storage control device, the storage system and/or administrator identify (301) the respective secondary storage control port configured to have secondary responsibility for the given LUN. Those versed in the art will readily appreciate that different storage control devices (e.g. different servers in the control grid 102) can have secondary responsibility for different LUNs controlled by the same storage control device with the primary responsibility; accordingly secondary storage control ports for different LUNs can be located in the same or in different secondary storage control devices.

The storage system reduces (302) outbound I/O operation in the primary port related to a first LUN among the LUNs primary controllable by the primary storage control device, thereby causing a situation requiring switching respective I/O requests to the alternating path (i.e. to respective secondary storage control port); and analyzes (303) responsive changes (if any) in outbound I/O operation at the respective secondary storage control port. The storage system verifies (305) operability of switching to one or more secondary control devices upon repeating (304) operations (302) and (303) for all LUNs controllable by the primary storage device. Sufficient increase in outbound I/O operation at all secondary storage control ports responsive to respective reduction of outbound I/O operation at the primary storage control ports indicates successful verification of alternating switching operability. After such verification the primary storage control device can be down, if necessary. The increase in outbound I/O activity is considered as sufficient if it matches a predefined criterion (e.g. a criterion predefined as a threshold value and/or related to a ratio between reduction of outbound activity at the primary port and respective increase of the outbound activity at the secondary port, etc,).

Those versed in the art will readily appreciate that verifying the switching operability is not bound the operations and the sequence thereof detailed with reference to FIG. 3. Responsive changes of outbound I/O operations of at least part of the secondary storage control ports can be analyzed in parallel. Optionally, if changes of outbound I/O operations of the secondary storage control ports are analyzed serially, the procedure can be stopped after a first negative result. Optionally, the procedure can be provided only for LUNs matching a predefined criterion (e.g. related to critical applications).

Alternatively or additionally to reduction of outbound I/O activity with the help of the special routine detailed with reference to FIG. 2, the outbound I/O operation related to a given LUN can be reduced with the help of ALUA (Asymmetric Logical Unit Access) technology.

Asymmetric logical unit access technology enables configuring the access characteristics of one port differently from those of another port. For example, SCSI target devices with target ports implemented in separate physical units may need to designate differing levels of access for the target ports associated with each logical unit. In an ALUA-enabled storage system, a LUN controller ownership can be configured in implicit mode, thus enabling assigning and changing a managing controller for a given LUN. In such a configured stored system, changing configuration of a controlling port from optimized (i.e. issuing I/O directly to the respective LUN) to non-optimized (i.e. issuing I/O to the respective LUN only if there is no other available port) can cause reduction of outbound I/O operation of the primary port.

Reduction of outbound I/O operation of the primary port, causing a situation requiring switching to a respective secondary storage control port, can be used in a manner detailed with reference to FIGS. 2-3.

Alternatively, the configuration of the primary port in an ALUA-enabled storage system to non-optimized can be provided in a manner though causing the reduction of outbound I/O operation at the primary port, but not switching all respective I/O requests to the alternating path. Thus, as illustrated with reference to FIG. 4, operability of switching responsibility from the primary storage control device can be verified without identifying corresponding secondary control ports at the secondary storage control device.

In accordance with certain embodiments of the currently presented subject matter, in an ALUA-enabled storage system, a primary storage control corresponding to a first LUN among the LUNs primary controllable by the primary storage control device is configured (401) as non-optimized, thereby causing reduction of outbound I/O operation at this port, subject to that the corresponding secondary storage control port is operable. The storage system analyzes (402) responsive changes (if any) in outbound I/O operation at the primary storage control port. The storage system verifies (404) operability of switching to one or more secondary control devices upon repeating (403) operations (401) and (402) for all LUNs controllable by the primary storage device. After such verification the primary storage control device can be down, if necessary.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a multipath storage system, the method comprising:
   identifying a primary storage control port configured for providing a primary path to a given logical block address (LBA) range and a secondary storage control port configured for providing an alternate path to the given LBA range;
   reducing an outbound I/O operation related to the given LBA range and occurring at the primary storage control port, thereby causing a situation requiring switching all I/O requests directed to the given LBA range to the alternate path; wherein the reducing comprises:
   (a) identifying all the I/O requests directed to the given LBA range, and
   (b) putting all the I/O requests directed to the given LBA range on hold for a delay period, thus giving rise to delayed I/O requests; wherein the delay period exceeds a time of an I/O delay required to enable switching of all the I/O requests directed to the given LBA range to the alternate path; and
   analyzing responsive changes in the outbound I/O operation related to the given LBA range and occurring at the secondary storage control port, and
   verifying operability of switching of all the I/O requests directed to the given LBA range to the alternate path in accordance with results obtained from the analyzing.

2. The method of claim 1 wherein the switching of all the I/O requests directed to the LBA range to the alternate path is verified as successful if a responsive increase in the outbound I/O operation at the secondary storage control port related to the said given LBA range matches a predefined criterion.

3. The method of claim 2 wherein said responsive increase matches the predefined criterion if a ratio between a reduction of the outbound I/O operation at the primary storage control port and the responsive increase in the outbound I/O operation at the secondary storage control port matches a predefined threshold value.

4. The method of claim 1 further comprising serving the delayed I/O requests if said delayed I/O requests are pending at the primary control storage port upon an end of the delay period, wherein the delay period is configured to be short enough to minimize possible interruption caused by delaying the I/O requests directed to the given LBA range if the switching to the alternating path is unsuccessful.

5. The method of claim 1 comprising running a background process enabling continuous scheduled verification of the operability of the switching to the alternate path.

6. The method of claim 1 further comprises emulating inbound I/O requests at the primary storage control port in order to enable further reduction of the outbound I/O operation.

7. The method of claim 1 wherein the outbound I/O operation at the primary storage control port is reduced with the help of Asymmetric Logical Unit Access (ALUA) technology.

8. A method of operating a multipath storage system, the method comprising:
   identifying, for a given LUN (Logical Unit Number) controlled by a first primary storage control port of a primary storage control device, a secondary storage control port configured to provide an alternate path to the given LUN, wherein the secondary storage control port is comprised in a secondary storage control device having a secondary responsibility for controlling the given LUN;
   reducing an outbound I/O operation related to the given LUN and occurring at the primary storage control port, thereby causing a situation requiring switching I/O requests directed to the given LUN to the alternate path; wherein the reducing comprises:
   (a) identifying the I/O requests directed to the given LUN, and
   (b) putting the I/O requests directed to the given LUN on hold for a delay period, thus giving rise to delayed I/O requests; wherein the delay period exceeds a time of an I/O delay required to enable switching the I/O requests directed to the given LUN to the alternate path; and
   analyzing responsive changes in the outbound I/O operation related to the given LUN and occurring at the secondary storage control port;
   verifying operability of switching of the I/O requests directed to the given LUN to the alternate path in accordance with results obtained from the analyzing; and
   verifying operability of switching responsibility from the primary storage control device to the secondary storage control device, wherein the switching responsibility from the primary storage control device to the secondary storage control device is successful if a verification of the switching to the alternating path is successful for all LUNs primary controlled by the primary storage control device and secondary controlled by the secondary storage control device.

9. The method of claim 8 wherein the verifying of the operability of switching of the I/O requests directed to the given LUN the responsibility from the primary storage control device to the secondary storage control device is followed by shutting down the primary storage control device for hot upgrade purposes.

10. The method of claim 8 wherein the switching of the I/O requests directed to the given LUN to the alternate path is verified for all the LUNs in a successive manner.

11. The method of claim 8 wherein the switching of the responsibility from the primary storage control device to the secondary storage control devices is verified as successful if a responsive increase in the outbound I/O operation at the secondary storage control port matches a predefined criterion.

12. The method of claim 8 further comprising serving the delayed requests if said delayed I/O requests are pending at the primary control storage port upon the end of the delay period, wherein the delay period is configured to be short enough to minimize possible interruption caused by delaying the I/O requests directed to the given LBA range if the switching of the I/O requests directed to the given LUN to the alternating path is unsuccessful.

13. The method of claim 8 further comprises emulating inbound I/O requests at the primary storage control port in order to enable further reduction of the outbound I/O operation.

14. A non-transitory computer readable medium storing a computer readable program that when being executed by a computer, causes the computer to perform a process of verifying operability of switching to an alternating path in a multipath storage system, the process comprising:

identifying a primary storage control port configured for providing a primary path to a given logical block address (LBA) range and a secondary storage control port configured for providing an alternate path to the given LBA range;

reducing an outbound I/O operation related to the given LBA range and occurring at the primary storage control port, thereby causing a situation requiring switching all I/O requests directed to the given LBA range to the alternate path;

wherein the reducing comprises:
(a) identifying all the I/O requests directed to the given LBA range, and
(b) putting all the I/O requests directed to the given LBA range on hold for a delay period; wherein the delay period exceeds a time of an I/O delay required to enable switching of all the I/O requests directed to the given LBA range to the alternate path; and analyzing responsive changes in the outbound I/O operation related to the given LBA range and occurring at the secondary storage control port, and verifying operability of switching to the alternate path in accordance with results obtained from the analyzing.

15. A computer program product comprising a non-transitory computer readable medium storing computer readable program code for a computer verifying operability of switching to an alternating path, the computer program product comprising:

computer readable program code for causing the computer to identify a primary storage control port configured for providing a primary path to a logical block address (LBA) range and a secondary storage control port configured to for providing an alternate path to the given LBA range;

computer readable program code for causing the computer to reduce an outbound I/O operation related to the given LBA range and occurring at the primary storage control port, thereby causing a situation requiring switching all I/O requests directed to the given LBA range to the alternate path; wherein the computer readable program code for causing the computer to reduce further comprises:
(a) computer readable program code for causing the computer to identify all the I/O requests directed to the given LBA range, and
(b) computer readable program code for causing the computer to put the I/O requests directed to the given LBA range on hold for a delay period; wherein the delay period exceeds a time of an I/O delay required to enable switching the I/O requests directed to the given LBA range to the alternate path; and computer readable program code for causing the computer to analyze responsive changes in the outbound I/O operation related to the given LBA range and occurring at the secondary storage control port, and computer readable program code for causing the computer to verify operability of switching to the alternate path in accordance with results obtained from the analyzing.

* * * * *